T. P. WALSH.
PILE WIRE LOOM.
APPLICATION FILED MAR. 11, 1911.

1,088,856.

Patented Mar. 3, 1914.
7 SHEETS—SHEET 1.

Fig. 1.

Witnesses:
Edward R. Barker.
H. C. Bowser.

Inventor:
Thomas P. Walsh,
by Geo. H. Maxwell,
Attorney

T. P. WALSH.
PILE WIRE LOOM.
APPLICATION FILED MAR. 11, 1911.

1,088,856.

Patented Mar. 3, 1914.
7 SHEETS—SHEET 2.

Fig. 2.

Witnesses:
Edward R. Barker
H. C. Bowser

Inventor:
Thomas P. Walsh,
by Geo. W. Maxwell,
Attorney.

T. P. WALSH.
PILE WIRE LOOM.
APPLICATION FILED MAR. 11, 1911.

1,088,856.

Patented Mar. 3, 1914.
7 SHEETS—SHEET 5.

Witnesses:
Edward R. Barker
H. C. Bowser

Inventor:
Thomas P. Walsh,
by Geo. H. Maxwell,
Attorney.

T. P. WALSH.
PILE WIRE LOOM.
APPLICATION FILED MAR. 11, 1911.

1,088,856.

Patented Mar. 3, 1914.
7 SHEETS—SHEET 6.

Witnesses:
Edward R. Barker.
H. C. Bowser.

Inventor.
Thomas P. Walsh,
by Geo. H. Maxwell,
Attorney

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

PILE-WIRE LOOM.

1,088,856.   Specification of Letters Patent.   Patented Mar. 3, 1914.

Application filed March 11, 1911. Serial No. 613,892.

*To all whom it may concern:*

Be it known that I, THOMAS P. WALSH, a citizen of the United States, and resident of Boston, in the county of Suffolk and State of Massachusetts, have invented an Improvement in Pile-Wire Looms, of which the following description, in connection with the accompanying drawings, is a specification, like letters on the drawings representing like parts.

My invention is a pile loom, or to be more specific, a pile wire mechanism for a carpet loom or the like.

Among the principal objects of my invention is first the provision of special pile wire laying mechanism, which does away with the usual requirements of extensive floor space, so that the loom occupies practically no more floor space than if it did not have a pile wire laying mechanism; and second, the provision of pile wire laying mechanism capable of handling an exceedingly long pile wire with practically the same certainty of movement and position as in the case of the usual short pile wire, thereby removing one of the principal objections which has heretofore prevented the weaving to good advantage of extremely wide carpets; and third, the provision of means of insuring the absolutely correct laying of the pile wire, or, in other words, the prevention of the pile wire bending or squirming out of position in the midst of the fabric as said wire is being inserted. My invention also preferably comprises a pile wire having cutting means and provision at each end for enabling it to be pulled or maintained under tensile strain from either end.

The preferred embodiment and various constructional details of my invention will be more fully understood from the following description taken in connection with the accompanying drawings in which I have shown preferred embodiments of the invention, the invention being further defined in the appended claims.

In the drawings, Figs. 2 and 3 are views of the loom in front elevation, the former showing the left hand portion and the latter the right hand portion respectively, the middle portion being omitted and various parts broken away. Fig. 12 is an enlarged detail in vertical longitudinal section showing the transferring device in relation to the adjacent parts of the loom; Figs. 13, 14 and 15 are fragmentary views, respectively in rear elevation, top plan and end elevation of the tripping and locking device used in connection with the shuttle or wire carrier or placer; Figs. 17, 18, 19 and 20 are the views of the shuttle or wire carrier or placer; Fig. 17 showing a detail on the section line 17—17 of Fig. 20; Fig. 18 showing a right hand end elevation thereof; Fig. 20 showing a front elevation thereof; Fig. 21 is a vertical longitudinal sectional view of a modified form of wire moving mechanism.

The loom proper may be of any usual or preferred kind comprising side frames 1 and 2 provided with the usual breast beam 3 to which the ground warp threads 4 and 5 are delivered over a warp roll 6, being delivered through usual heddle frames or harnesses 7 and 8, the pile supplies of pile warps 9 being delivered over guide rods 10 and controlled by usual heddles 11 of a jacquard mechanism. The lay 12 has its lay swords 13 operated in the usual manner by links 14, cranks 15 and a crank shaft 16. Any usual or preferred kind of fly shuttle 17 and driving mechanism 18 therefor may be employed. The reed 19 may be of any usual or preferred kind for controlling the ground warp threads. Above said reed is mounted deflecting mechanism herein shown as comprising obliquely extending separators or deflectors 20, preferably consisting of extensions of the reeds, their relative arrangement being best shown in Fig. 16. In the gaps 21 formed by these deflectors depend or are mounted the wire shifting mechanism, which, in the preferred embodiment of the invention, comprises a gear 22 journaled in a depending bearing 23 from the front overhanging portion of the top or support 24 secured at the upper end of the lay sword. Secured at the front end of the shaft 25, which carries the gear 22, is a pinion 26 in mesh with a driving gear 27 whose shaft 28 is journaling above the shaft 25 and carries a pinion 29 in position to be rocked by a reciprocating rack bar 30, held in position by a guide plate 31. The rack bar 30 is regulated by a link 32 secured at one end to an ear 33, projecting perpendicularly through a slot (not shown) in the guide plate 31 and pivoted at its opposite end 34 to an actuating lever 35 pivoted at 36 to a rocker arm 37, which is operated by the lay sword, and a rod 38 connects at 39 with said lever 35 and at 40 with a crank arm 41 on the outer end of a rocker shaft 42, from whose inner end projects upwardly a cam lever 43 whose roll 44 travels in a path cam 45 fast on the cam shaft 46. The gears 22 of the shifting mechanism are spaced apart at suitable intervals according to the requirements of the given loom and work as clearly shown in Figs. 2 and 3. Coöperating with the gears 22 there is provided preferably a shuttle or wire carrier or placer shown in Figs. 2, 17–20, as comprising a body portion 47 provided with a rack 48 at its upper side and protected by shrouds or guards 49 and having at its opposite sides ways 50 to receive the inturned ends 51 of supports 52 herein shown as located at the front and back sides of the gears 22 across the loom, and which, therefore, form guards for the gears and also tracks for the wire placer to travel upon. Depending from the body 47 of the wire placer is a rib 53 rounded at its ends 54 for crowding down any warp thread 5 which might be slightly raised out of its place. Especially in wide looms where the pile wire will have considerable length and therefore tends to twist, I prefer to provide the propeller gears 22 at sufficiently frequent intervals in proportion to the length of the carrier or placer 47 so that the latter will always be engaged and supported by at least two of the gears 22 and adjacent supporting members 52, whereby the tendency of said placer to turn or rock axially is effectively prevented. Thus as the placer 47 is just about to be engaged by one gear 22, it is still engaged by two preceding gears 22 which serve to hold it and the wire carried thereby in proper relation and position.

Figure 11:
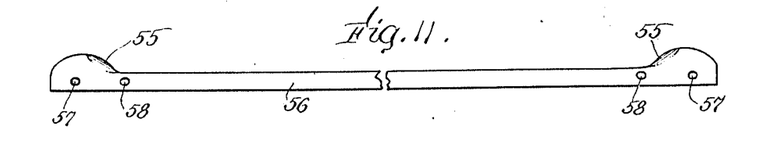
Fig. 11 is a broken view in front elevation of the preferred pile wire.
Figures 17, 18, 19, 20, 21:
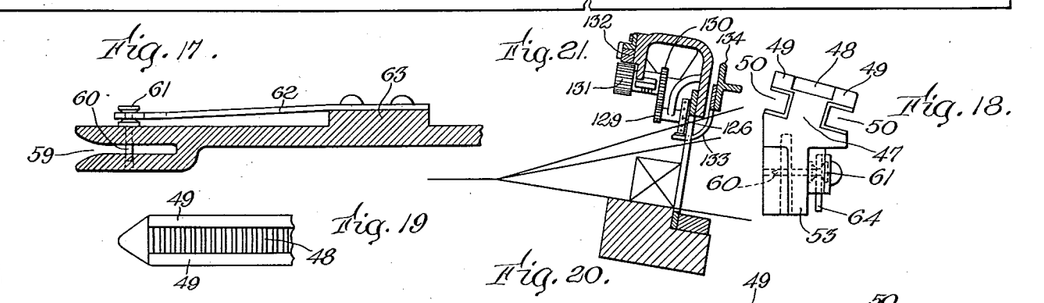

The wire is best shown in Fig. 11 and consists of opposite cutting ends or knife edges 55 and a usual intermediate part 56. As herein shown an end hole 57 and an adjacent hole 58 are provided at each end of the pile wire, this being a convenient means for permitting the wire to be engaged and disengaged by the mechanism provided for handling the same. The wire placer is provided at its rear end with a recess 59 preferably having a flaring end, and is best shown in Fig. 17, and a transversely movable locking pin 60 whose shouldered head 61 is mounted in the slotted outer end of a leaf spring 62 secured at its opposite end to a boss 63 of the placer 47. The spring 62 has a depending lug or lip 64, see Fig. 20, which, when the placer is arriving at the left hand end of the loom and is about to receive a wire, strikes against the inclined end 65 of a cam trip 66 and is thereby deflected rearward, see Figs. 14 and 15, until the pin 60 has been pulled out of recess 59 which thereupon receives the end of the pile wire and the continued movement of the placer to the left of Fig. 2 then permits the lug 64 of said spring 62 to pass beyond the trip 66 so that the pin 60 immediately snaps into place across the recess 59 and through the hole 57 of the pile wire which is now embraced and thereby locked in the recess of the wire placer or carrier 47. Thereupon the movement of the wire carrier or placer is reversed. As it starts forward to the right across the loom, the lug 64 of said spring 62 strikes against the oblique front 67 of the trip 66 thereby swinging said trip out of the way on its pivot 68, the spring 69 serving to restore said trip to operative position for unlocking the pin 60 when the carrier or wire placer comes back again on its next trip.

The mechanism which delivers the wires into position to be received by the wire carrier or placer is best shown in Figs. 1, 2, 7–10, and 12. A wheel or drum-like transferring device 70 is mounted on a shaft 71 journaled in a bracket 72 whose lower portion is secured, for purposes of rigidity, at its opposite ends 73 and 74 to the side frame 1, said bracket also carrying a housing 75 for inclosing the outer portion of said wheel so as to protect the operator from accidentally coming in contact with it and also to carry a series of bearing rolls 76, see Fig. 7, for facilitating the movement of the pile wire. The pile wires are fed to the wheel or transferring device 70 at the left hand side adjacent to the breast beam and delivered by said transferring device 70 at the right hand side in line with the lay at that moment. At some suitable place on the loom, herein shown as at the front of the breast beam, I mount a reciprocating device, preferably a slide 77 movable in a guide 78, and actuated by a lever 79 pivoted at 80 at its lower end and operated by a link 81 and rock arm 82 fast on a rock shaft 83 journaled in a bracket 84 and provided with a rock arm 85 pivotally connected at 86 by a link 87 to a cam lever 88, whose roll 89 is actuated by a path cam 90 on the cam shaft 46. From this slide 77 projects an arm 91 which has at its forward end an obliquely projecting finger or catch 92, see Fig. 7, for catching into the hole 57 of the pile wire, so as to pull said wire forward into the position shown in Fig. 7, so as to permit the wheel 70 to engage said wire for the purpose of carrying the same forward. For this purpose, the wheel 70 is provided with a series of relatively sharp prongs or catches 93, herein shown as carried at the free end of a relatively stiff spring 94 mounted in a recess or opening 95 adjacent to the periphery of the wheel, the prongs or catches being preferably provided with a projection 96 to strike against an adjacent part of the wheel to prevent undue outward movement, but being free to move inwardly when required. The normal position of the catch is outward, and when the wheel, in its rotation in the direction of the arrow Fig. 7, brings a catch 93 around into engagement with the wire, which has been brought forward by the arm 91 on the catch 92, said catch 93 slides along the wire until it reaches the hole 58, and then projects into said hole and immediately starts the wire forward. The result is that the wire is instantly taken from the catch 92 and carried forward by the wheel under the guidance of the housing 75 and the rollers 76. When the forward end of the wire reaches the opposite or outgoing side of the wheel, its extreme forward end is received by a tangential guideway 97 which strips it from the catch 92 which has thus far been in engagement with its hole 58. Preferably the periphery 98 of the wheel 70 is provided with a friction surface either of frictional material or by being milled, so as to be certain, in coöperation with the rolls 76, of insuring the proper movement of the wire 56 after the engagement thereof by the catch 93. The wheel continues its rotation until the pile wire has reached approximately the position as shown at the right end of Fig. 7 and then stops, thereby holding the wire in this position until it is engaged by the wire placer 47, whereupon the wheel starts to rotate again, thereby aiding the wire placer in easily moving the wire forward into the fabric. When the wire has been fed across the loom by the mechanism provided for this purpose (preferably the wire placer 47) the wire placer or moving mechanism therefor halts and the lay swings forward. In its forward movement, the forked end 99 of a lever 100, which is pivoted at 101 on a bracket 102 from the lay sword rides along a cam track or ridge 103 fast on the frame 2, and when said forked end 99 arrives at the deflected point 104 of said cam, the forward end 105 of the lever 100 is thereby swung inwardly toward the middle of the loom, so as to move the obliquely projecting end 106 of a slide 107 between the lug 64 and the adjacent wall of the rib 53 of the wire placer 47, so as to withdraw the pin 60 from engagement with the forward end of the pile wire. The lever 100 has its forward end 105 slotted at 108 to engage an upwardly projecting pin 109 on the adjacent slide 107. As soon as the pin 60 has been moved into unlocked position, the pile wire, being thereby released and already almost at the fell, shifts instantly out of engagement with the placer and into proper position at the fell, being moved into its final position by the operation of the reed in usual manner. The pile wire projects beyond the selvage at each of its ends and the succeeding pile wires are permitted to accumulate in the usual manner, until the first one has arrived in position to be engaged by the catch 92 of the arm 91 carried by the slide 77, whereupon said arm and catch automatically engage and remove the pile wires, one after the other, causing them automatically to perform the pile cutting operation and then delivering the pile wires, in timed relation, to the transferring device 70 which engages the pile wires successively and transfers them from the fabric back to the wire placer which again places said wires in the fabric. This cycle of operations proceeds continuously as long as the weaving progresses and is accomplished without materially increasing the width of the loom beyond the ordinary width which the loom would have if it were not a pile loom.

I have shown the arm 91 as short and have placed the slide 77 in line with the breast beam, but it will be understood that this arrangement is merely for convenience, in order to accommodate a relatively large wheel 70 for the more ready manipulation of the pile wires, but this wheel may be varied in size and the point for removing the pile wires from the fabric may be moved farther rearward of the loom or near the fell, as may be preferred. This will depend to some extent upon the number of pile wires which any particular manufacturer may prefer to have in a fabric at one time, and also in part upon the kind of fabric and the coarseness and kind of weave.

Figures 4, 5, 6:
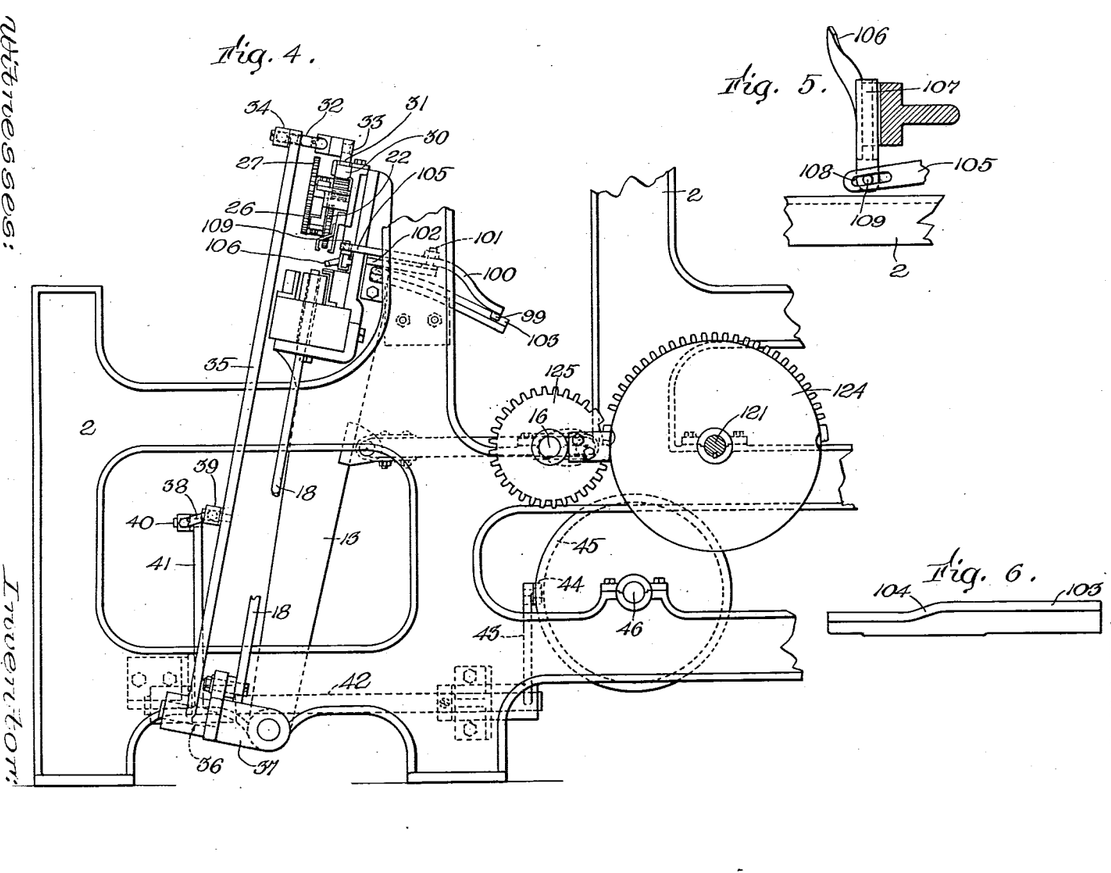
Fig. 4 is a fragmentary end elevation of the loom looking at the right hand end.
Fig. 5 is a sectional view on the line 5 of Fig. 3.
Fig. 6 is a plan view of a cam for operating the mechanism shown in Fig. 5.
Figure 5:
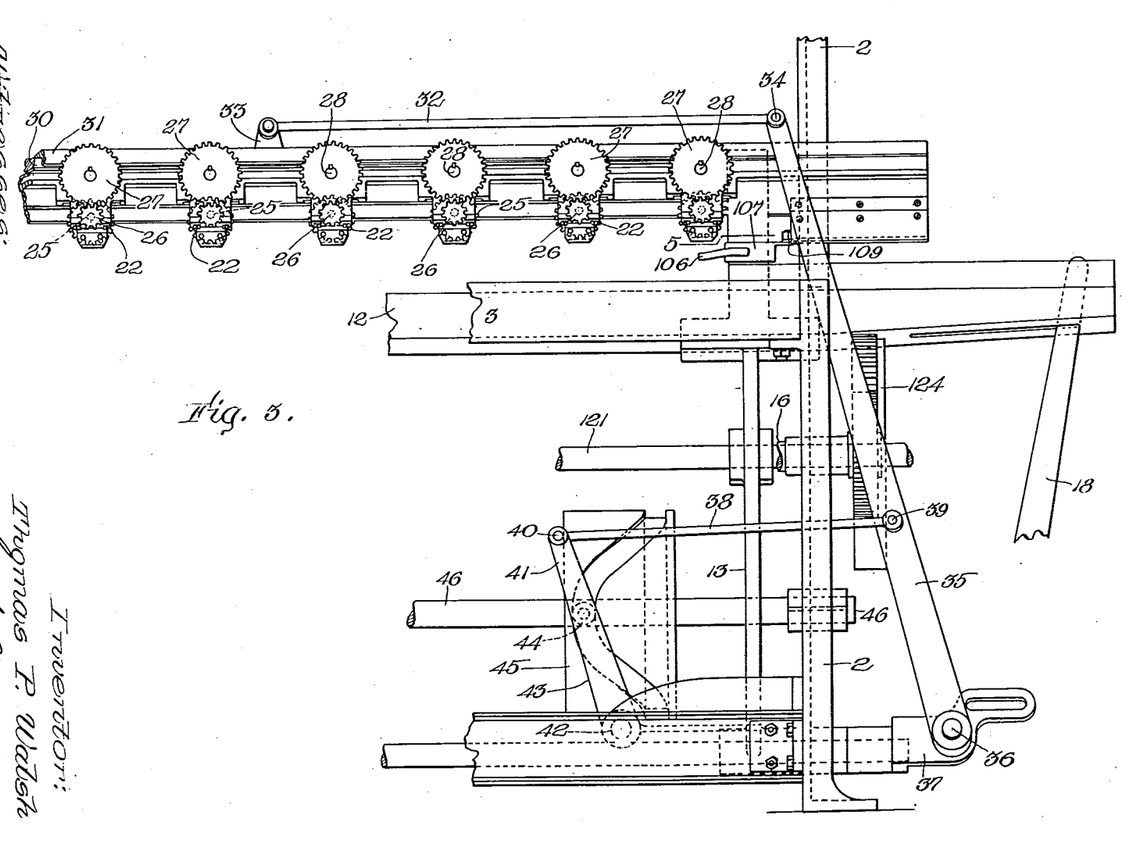

Preferably a wheel is used as the transferring device and preferably this is unidirectional, and preferably it extends in an approximately horizontal plane, although it will be understood that in all these respects I am not limiting myself to the embodiment herein shown. The shaft 71 of this wheel 70 is provided with a bevel-gear 110 meshing with a similar gear 111 on a shaft 112 driven by gears 113, 114 and a shaft 115 and gears 116, 117 and shaft 118 and mutilated gears 119, 120, the latter being fast on the cam shaft 46. The latter receives motion from a drive shaft 121 through any suitable mechanism, herein shown as spur gears 122 and 123. The drive shaft 121 also drives the crank shaft 16 of the lay mechanism by a pair of mutilated gears 124, 125, Fig. 4.

While as already stated, the main object of the invention is to handle longitudinal pile wires in such a manner as not to require the extended floor space for handling pile wires, which has heretofore been necessary, I prefer to carry this object out by means of mechanism which also bends the pile wires.

A further important object is to provide automatic means for transferring the pile wires from position in the woven fabric to position in the weaving fabric in such a manner that the pile wire is maintained positively in accurate and proper position at all times. Another result accomplished is that the pile cutting operation, and the transfer of the wire and the insertion thereof into the fabric is a continuous operation.

Figures 22, 23:
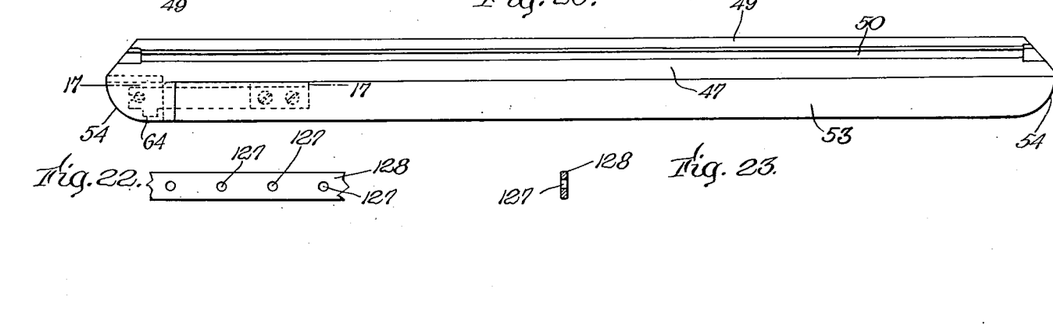
Figs. 22 and 23 are fragmentary views in front elevation and cross section respectively of the modified form of pile wire to be used in connection with the mechanism shown in Fig. 21.

A further important feature of my invention is the provision of means for maintaining the pile wire in positive control as it is delivered into the fabric. Referring to this last mentioned feature, while I prefer the gear and rack bar arrangement of mechanism and the employment of a traveling device such as the shuttle or carrier 47 for placing the wire, I do not intend to limit myself to this construction, as, instead of the gear 22, I may provide a pin wheel 126, Fig. 21, to engage holes 127 in a pile wire 128, Figs. 22, 23, said pin wheel being operated by gears 129, 130, the shaft of the latter carrying a pinion 131 operated by a rack 132. The wire 128 is held up to the pin wheel by depending supports or fingers 133 carried by a stationary rail 134 spanning the loom.

Figure 1:
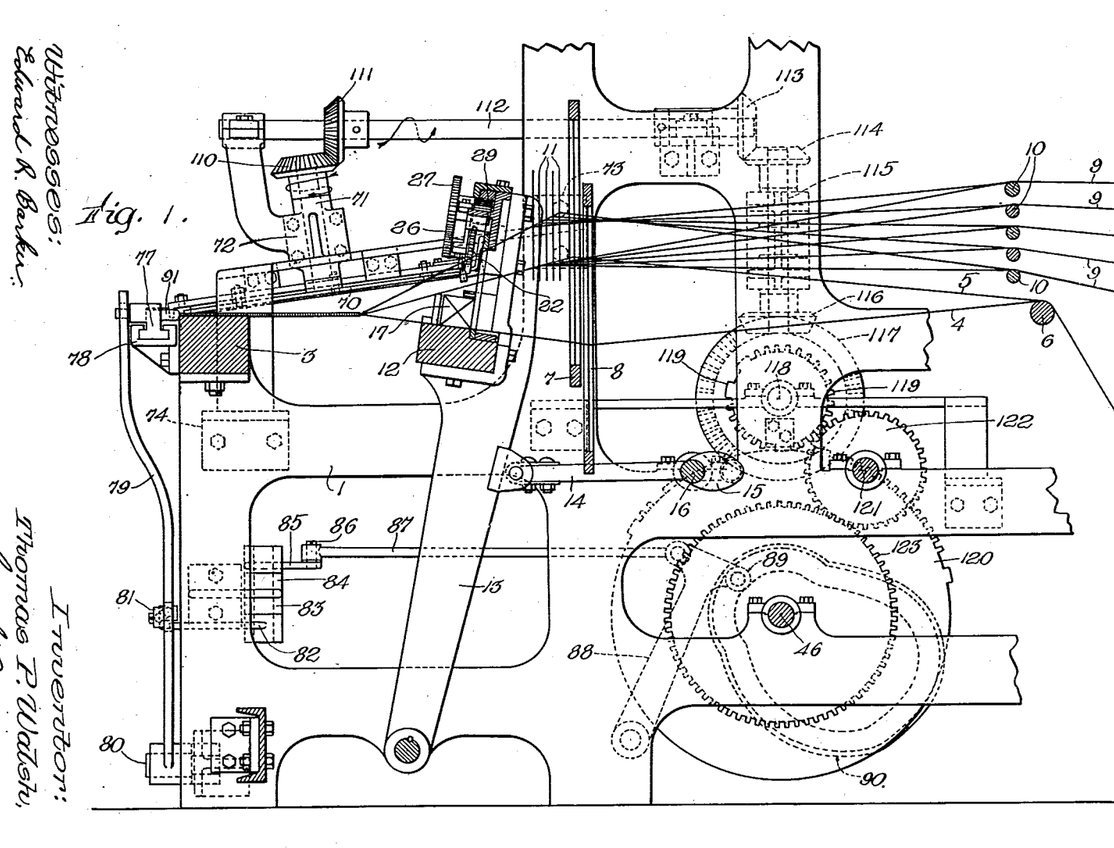
Figure 1 is a central vertical longitudinal section of a loom constructed in accordance with my invention, parts being broken away and omitted for clearness of illustration.
Figure 2:
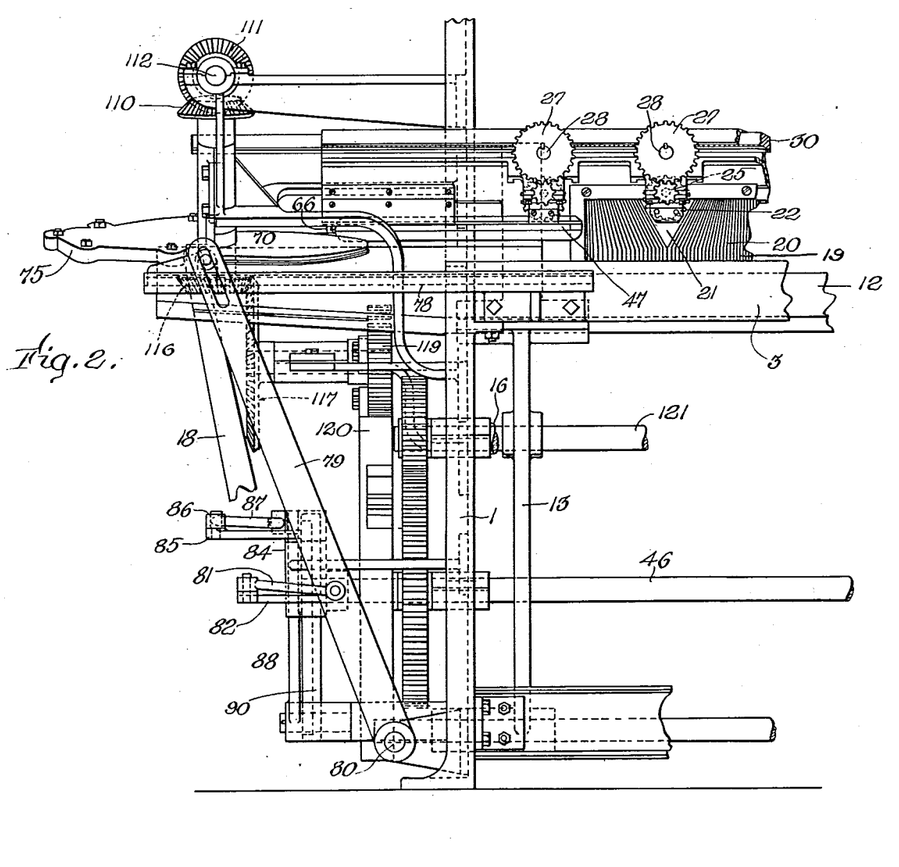
Figures 12, 14, 15, 16:
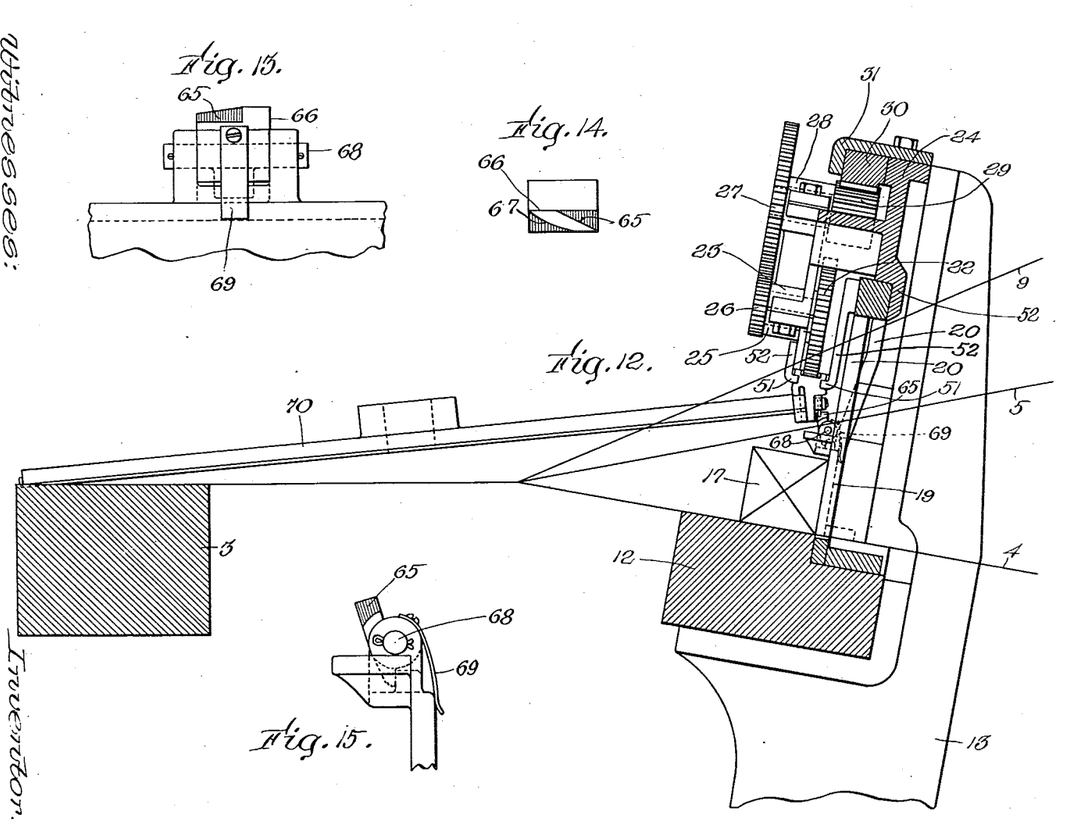
Figure 16:
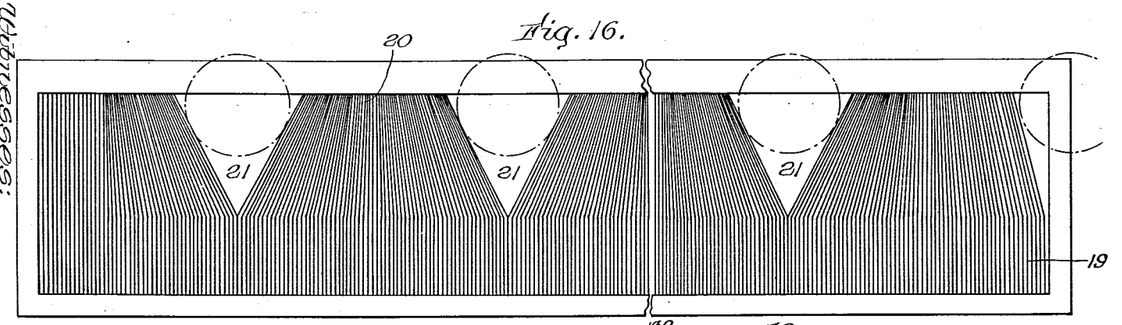
Fig. 16 is a view in front elevation of the reed and pile warp deflectors.

In the embodiment of my invention illustrated in the drawings, the reed, Figs. 2 and 16, is shown for a relatively fine weave, and in order to prevent the liability of the warp threads from wedging or becoming crowded in the spaces between the deflectors 20 as said warp threads are obliquely deflected in their upward movement, Fig. 16, I stagger certain of the deflectors 20 with relation to the rest. This may be done in any order deemed preferable in any given instance, but ordinarily it will be sufficient to have every other one of these deflectors 20 extending straight up as shown in Fig. 12 and the others extend slightly rearwardly, the object being to insure that the space which the threads occupy and in which said threads must move up and down, between the adjacent deflectors, shall be approximately parallel, by which I mean that they shall not keep drawing narrower to their upper extremities, but shall be sufficiently wide at the top and also at the bottom for permitting the free movement of the threads. This object may be attained in various ways, but I prefer to make the deflectors themselves of uniform thickness or width from top to bottom, so as to have the same strength and stiffness all the way up, and to prevent the narrowing of the thread passage by simply deflecting or staggering the successive deflectors to a sufficient extent from the adjacent deflectors so as to open the passage either rearwardly or forwardly enough to counteract the wedged shape.

Figures 7, 8:
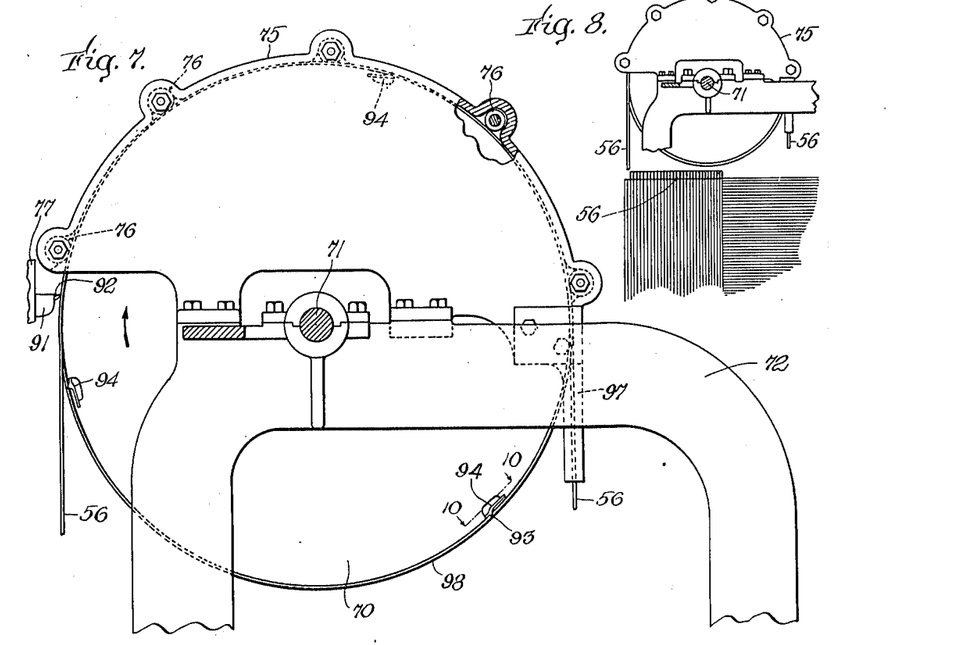
Fig. 7 shows in top plan the preferred form of transferring device.
Fig. 8 is a similar plan view of the transferring device illustrating more fully its use.
Figure 9:
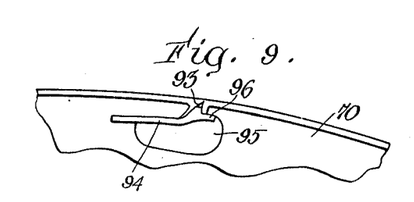
Figs. 9 and 10 are fragmentary views, enlarged, of the transferring device, showing the same respectively in top plan and section (on the line 10—10, Fig. 7)
Figure 10:
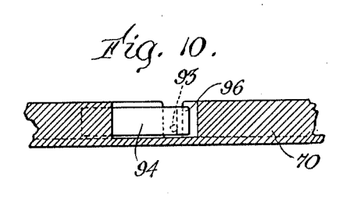

In operation, let it be supposed that the loom is in the condition and position shown in the drawings, and that the lay has just reached its point of dwell or back position and the two sheds have been formed (by any usual mechanism), and the pile wire 56 is being held stationary in the position as shown in Fig. 7. The pile wire shuttle or placer 47 is moved the rest of its travel to the left, Fig. 2, by the operation of the rack 30 actuated by the link 32, lever 35 and connections 38, 41, 42, 43 and cam 45, and as it about reaches the end of its throw, its ear 64 engages the deflecting surface 65 of the pivoted trip 66 thereby pulling out the locking pin 60 just as the recess 59 is sliding over or embracing the leading end of the pile wire 56, and as said pile wire 56 is thus engaged by the placer 47 said ear 64 snaps off from the extreme left hand end, Fig. 14, of said trip thereby permitting the locking pin 60 to snap instantly into the hole 57 of the pile wire. Preferably the recess 59 is sufficiently deep and the movement of the placer sufficiently ample to embrace the end of the wire 56 farther than required, so that the tapered end of pin 60, in such case, strikes behind the hole 57 and does not snap into said hole until the placer begins to move forward, the pin sliding along on the wire until it reaches the hole 57, then snapping into said hole. At the same time that the placer 47 starts back across the loom with the wire 56, the transferring wheel 70 begins rotating at the same rate of peripheral movement thereby feeding the wire forward so as to relieve the inserting mechanism of undue strain, the frictional surface with which the wheel is preferably provided coöperating with the rolls 76 to make this feeding movement certain and easy. As the placer 47 moves forward it is held in accurate position by the sectional tracks 51, thereby coöperating with the mechanism 70, 76, 97 in maintaining the wire positively in accurate and stable position, said placer being engaged by at least two of the driving pinions 22 at all times. These pinions 22 and the sectional tracks extend down into the gaps 21 so that said pinions engage the racks 48 of the placer or carrier 47. At the same time that the pile wire is being delivered across the loom, as thus described, the fly shuttle 17 is being driven across the loom in the lower shed. At the moment when the pile wire has been moved into proper position, the lay starts to swing forward, thereby actuating the tripping device 100—106 so that by about the time that the reed has almost reached the fell the wire is released from the placer, the leading end of said wire being however held, up to that moment, in proper upright position by the placer throughout almost the whole of the forward swinging movement of the lay. During the beating up or forward swinging movement of the lay and the return movement thereof, the pile wire removing and delivering arm 91 moves back from its position, Figs. 2 and 7, into position to permit its catch 92 to engage the forwardmost pile wire 53 (at the breast beam as herein shown) and thereupon moves back again, drawing the pile wire partially out from the fabric until it arrives opposite the position shown in Fig. 7. During this movement the second shot of filling is inserted in the changed shed and the transferring wheel 70 starts to rotate, (the lay having just previously started to swing forward on its second beat, and the placer 47 having started to move back to the left, Figs. 2 and 3) and as said wheel brings the adjacent spring engaging device 94 against the wire which has been drawn out by the finger 91, its catch 93 slides into engagement with the adjacent hole 58 of said wire thereby pushing the wire forward or from the prong or catch 92 of said finger 91 and into general engagement with the housing 75 and rollers 76. The wheel 70 continues to rotate until it has brought the leading end of the wire 56 to the position shown in Fig. 7 and then comes to a halt, ready to be engaged by the placer which is on its way across the loom from right to left to get the particular transferred wire, as already described. This cycle of operations continues automatically until the fabric is completed. As each wire is drawn out from the fabric its rear cutting edge 55 cuts the pile loops. As herein shown the pile wire is reversed end for end at each successive cycle of operations so that first one end does the cutting and then the other end does the cutting of the pile loops.

The transferring mechanism is preferably rotary because simple and it is not liable to get out of order but it will be understood that I am not limited to this particular mechanism as the main object of bending the wire in a curved path is in order to economize floor space but its handling may be carried out by a wide variety of mechanism. Also it will be understood that, in transferring the pile wire from the woven fabric to the fabric not yet woven the direction of bending movement will necessarily be approximately lengthwise of the loom and preferably the bend will be sufficiently short so as to leave one end of the wire in the fabric while the other end is being entered again into the fabric (this depending, of course, to some extent upon the width of the fabric.) Preferably also a single wheel-like device is employed and is given a unidirectional movement, thereby simplifying the mechanism and operation, although requiring slightly greater width than would be the case if a plurality of rotary members were mounted closer to the loom than shown. I wish it understood however that, considering this part of my invention in its broader aspect, any means which serves to move the wire in such a path that the wire is deflected or bent from the receiving point to the delivering point is within the spirit and scope of my invention, irrespective of whether said deflecting or bending means is rotary or is a wheel. I also wish it understood that I consider it advantageous to insert the leading end of the wire, i. e., to enter into the fabric that end of the wire which first left the fabric upon being withdrawn, although, except as required by certain claims, I do not limit myself in this respect; and in general I wish it understood that I am not limited to the mechanism herein shown and stated to be preferred.

Having described my invention, what I claim as new and desire to secure by Letters Patent is:

1. In a pile-loom, means for inserting a pile-wire, containing mechanism for bending the pile-wire, so as to occupy less space than would be required if the wire is handled straight, said bending means having a wire-receiving portion in position forward of the fell and a wire-delivering portion in position at the same time back of the fell in line with the shed.

2. In a pile-loom, means for inserting a pile-wire, including a rotary member for feeding the wire forward to the loom, mounted to rotate in an unvarying position approximately in the plane of the shed.

3. In a pile-loom, means for removing a pile-wire from the pile fabric, including a rotary member for withdrawing the pile-wire mounted to rotate substantially in the plane of the fabric and forward of the fell.

4. In a pile-loom, means for handling a pile-wire, comprising transferring mechanism for taking the pile-wire from the fabric already woven, and replacing it in the fabric being woven, and containing means for deflecting the wire by a unidirectional movement of the wire in a direction from one of said points to the other in the course of this movement.

5. In a pile loom, means for handling a pile wire, comprising transferring mechanism for taking the pile wire from the fabric already woven and replacing it in the fabric being woven, and containing means for bending the wire in a U-shape from one of said points to the other in the course of this movement.

6. In a pile loom, means for handling a pile wire, comprising transferring mechanism for taking the pile wire from the fabric already woven and replacing it in the fabric being woven, and containing means for engaging one end of the wire at the woven fabric and inserting the same end of the wire into the fabric at the shed.

7. In a pile loom, means for handling a pile wire, comprising transferring mechanism for taking the pile wire from the fabric already woven and replacing it in the fabric being woven, and containing means for reversing the pile wire end for end for insertion into the fabric reversed from its previous position in the fabric.

8. In a pile loom, means for handling a pile wire, comprising transferring mechanism for taking the pile wire from the fabric already woven and replacing it in the fabric being woven, and containing means for reversing the wire end for end by a unidirectional movement of the wire from one of said points to the other in the course of this movement.

9. In a pile loom, means to engage a pile wire to pull the same in a direction away from the fabric, and separate pulling means to take said wire and move the same toward the fabric in the process of replacing the wire.

10. In a pile loom, means to engage one end of a pile wire to pull the same in a direction away from the fabric, and separate means to engage said wire and move the same end thereof ahead toward the fabric in the process of replacing the wire.

11. In a pile loom, weaving mechanism, including two shedding means, one for the pile wire, combined with means for positively pulling a pile wire through the pile wire shed across the loom.

12. In a pile loom, controlling mechanism for positively holding the forward end of a pile wire and continuously directing said forward end in accurate position as it is being inserted in the fabric.

13. In a loom, weaving mechanism, including two shedding mechanisms, one of said shedding mechanisms being for the pile wire, combined with means for handling a pile wire into and out of the loom, including means operating in the midst of said last mentioned shed for positively moving the pile wire into pile-forming position in said shed.

14. In a loom, weaving mechanism, including two shedding mechanisms, one of said shedding mechanisms being for the pile wire, combined with means for handling a pile wire into and out of the loom, including traveling means operating in the midst of said last mentioned shed for placing a pile wire in operative pile-forming position in said shed.

15. In a loom, weaving mechanism, including two shedding mechanisms, one of said shedding mechanisms being for the pile wire, combined with means for handling a pile wire into and out of the loom, including traveling means operating in the midst of said last mentioned shed for placing a pile wire in operative pile-forming position in said shed, and a plurality of operating mechanisms for said traveling wire-placing means located at intervals in the midst of the fabric across the loom.

16. In a loom, weaving mechanism, including two shedding mechanisms, one of said shedding mechanisms being for the pile wire, combined with means for handling a pile wire into and out of the loom, including traveling means operating in the midst of said last mentioned shed for placing a pile wire in operative pile-forming position in said shed, said placing means containing mechanism for maintaining continuous engagement with the forward end of the wire as it is being pulled into said shed.

17. In a loom, weaving mechanism, including two shedding mechanisms, one of said shedding mechanisms being for the pile wire, combined with means for handling a pile wire into and out of the loom, including traveling means operating in the midst of said last mentioned shed for placing a pile wire in operative pile-forming position in said shed, said placing means containing grasping means to grasp the end of the pile wire, tripping means for operating said grasping means to grasp the pile wire at the ingoing side of the loom, and tripping means for operating said grasping means to release the pile wire at the outgoing side of the loom.

18. In a loom, weaving mechanism, including two shedding mechanisms, one of said shedding mechanisms being for the pile wire, combined with means for handling a pile wire into and out of the loom, including gearing mounted to rotate in the midst of the warp threads of said last mentioned shed for positively moving and directing the pile wire being inserted in said shed.

19. In a loom, weaving mechanism, including two shedding mechanisms, one of said shedding mechanisms being for the pile wire, combined with means for handling a pile wire into and out of the loom, including means for grasping the end of the pile wire mounted to travel through the last mentioned shed, said grasping means being shorter than the width of the fabric being woven, and transferring devices located to operate within the fabric for positively engaging said grasping means in the shed to pass the latter from one transferring device to another, for maintaining the grasping means under positive continuous traveling control across the loom.

20. In a loom, weaving mechanism, including two shedding mechanisms, one of said shedding mechanisms being for the pile wire, combined with means for handling a pile wire into and out of the loom, containing means for grasping the end of the pile wire mounted to travel through said last mentioned shed, said grasping means being shorter than the width of the fabric being woven, and actuating mechanism for maintaining continuous positive control of said grasping means during its passage through the shed, including means for stopping said grasping means at one side of the loom to release a pile wire and means for stopping said grasping means at the other side of the loom to receive a pile wire.

21. In a loom, weaving mechanism, including two shedding mechanisms, one of said shedding mechanisms being for the pile wire, combined with means for handling a pile wire into and out of the loom, containing traveling means operating in the midst of said last mentioned shed for placing a pile wire in operative pile-forming position in said shed, said traveling placing means having a rack bar and means for engaging the wire and holding it upright in proper pile-forming position, and gearing mounted to operate in the midst of the fabric being woven in position to engage said rack bar for moving said traveling means and pile wire through said last mentioned shed.

22. In a loom, weaving mechanism, including two shedding mechanisms, one of said shedding mechanisms being for the pile wire, combined with means for handling a pile wire into and out of the loom, containing traveling means operating in the midst of said last mentioned shed for placing a pile wire in operative pile-forming position in said shed, said traveling placing means having a rack bar and means for engaging the wire and holding it upright in proper pile-forming position, and a plurality of gears located at intervals across the loom and mounted to operate within said last mentioned shed in the midst of the fabric being woven and in position to engage successively the rack bar of said traveling means and pass the latter from one gear to another through said shed.

23. In a loom, weaving mechanism, including two shedding mechanisms, one of said shedding mechanisms being for the pile wire, combined with means for handling a pile wire into and out of the loom, containing traveling means operating in the midst of said last mentioned shed for placing a pile wire in operative pile-forming position in said shed, and positioning means for maintaining engagement with said traveling spacing means at all times at a plurality of places in the length of the placing means as the latter moves through said shed.

24. In a loom, weaving mechanism, including two shedding mechanisms, one of said shedding mechanisms being for the pile wire, combined with means for handling a pile wire into and out of the loom, containing mechanism, including a traveling part, for maintaining the pile wire in proper upright pile-forming position and against improper deflection and movement during its progress through said shed.

25. In a loom, weaving mechanism, including two shedding mechanisms, one of said shedding mechanisms being for the pile wire, combined with means for handling a pile wire into and out of the loom, containing mechanism, including a traveling part, for maintaining the pile wire in proper upright pile-forming position and against improper deflection and movement during its progress through said shed, said traveling part being provided on one side with a longitudinal rack, and having guards at each side of said rack, and being provided with engaging means for removably engaging the end of a pile wire.

26. In a pile loom, a pile wire inserting mechanism, including gearing mounted to rotate in the midst of the pile warp threads for positively moving and directing the pile wire being inserted, and means for deflecting the selected pile warp threads at each side of said gearing to form a gap therein, to receive said gearing and permit the latter to operate in connection with the pile wire.

27. In a pile loom, pile wire inserting mechanism including means projecting at intervals into the pile warp shed, and protecting means for protecting said means at each place where it projects into the shed.

28. In a pile loom, pile wire inserting mechanism, including a track normally within the pile warp shed for directing and controlling the position of the pile wire being inserted.

29. In a pile loom, pile wire inserting mechanism, including a track normally within the pile warp shed for directing and controlling the position of the pile wire being inserted, said track being composed of separate sections.

30. In a pile loom, pile wire inserting mechanism, including a track normally within the pile warp shed for directing and controlling the position of the pile wire being inserted, said track being composed of separate sections, and a traveling device for moving on said track and containing means for carrying the pile wire.

31. In a pile loom, a rotary member for handling a pile wire, provided with a yielding holding device constructed and located to engage a pile wire back from the end to move the same.

32. In a pile loom, a rotary member for handling a pile wire, provided with a yielding holding device mounted within the periphery of said rotary member and having an outward engaging movement to engage a pile wire to move the same.

33. In a pile loom, a rotary member for handling a pile wire, provided with a holding device having an outwardly projecting catch for engaging the pile wire from the side thereof which is next to the rotary member, and stripping means for guiding the pile wire tangentially from said rotary member and thereby stripping the wire from engagement with said projecting catch.

34. In a pile loom, a rotary member for handling a pile wire, and a plurality of guide rolls at intervals about the periphery of said member for retaining the wire in position frictionally against the rotary member and aiding in the movement thereof.

35. In a pile loom, a rotary member for handling a pile wire, provided with means for detachably engaging the pile wire, and a housing inclosing one edge of said member for retaining the pile wire against the rotary member and in the desired path of movement.

36. In a pile loom, a rotary member for handling a pile wire, and a stripping device for encompassing the forward end of the wire and having a tangential direction in line with the pile warp shed for directing the wire away from said member into said shed.

37. In a pile loom, a rotary member for handling a pile wire, provided with a yielding projection for catching into the forward end of the pile wire from the back side outward and thereafter moving the wire along with the member.

38. In a pile loom, catching means for catching the forward end of a pile wire, movable in a curved path for bending said wire in the movement thereof, and coöperating means for receiving and disengaging the pile wire from said catching means and delivering said wire into the loom.

39. In a pile loom, catching means for catching a pile wire, movable in a curved path for bending the wire, and automatic pile-wire withdrawing means for feeding the wire into position to be engaged by said catching means.

40. In a pile loom, catching means for catching a pile wire, movable in a curved path for bending the wire, and automatic pile-wire withdrawing means for feeding the wire into position to be engaged by said catching means and coöperating means for receiving and disengaging the pile wire from said catching means for delivery into the loom.

41. In a pile loom, a movable member provided with a pile wire engaging device having pile-wire withdrawing movement in a general direction lengthwise of the loom between one end of the shed and approximately the point where the pile wires are withdrawn from the woven fabric, and means coöperating with said movable member to bend the pile wires during their passage from the latter point to the shed.

42. In a pile loom, a movable member provided with a pile wire engaging device having a pile-wire withdrawing movement in a general direction lengthwise of the loom between approximately the point where the pile wires are withdrawn from the woven fabric and the point where they are inserted into the fabric being woven, and means for grabbing and pulling out said pile wires for delivering the pile wires successively from the woven fabric to said engaging device of said member.

43. In a pile loom, a movable member provided with a pile wire engaging device having a pile-wire withdrawing movement in a general direction lengthwise of the loom between approximately the point where the pile wires are withdrawn from the woven fabric and the point where they are inserted into the fabric being woven, and means for delivering the pile wires successively from the woven fabric to said engaging device of said member and coöperating stripping and directing means at the other end of said movement for delivering the pile wire from said member into the fabric being woven.

44. In a pile loom, automatic mechanism for transferring flat pile wires from edgewise position in the woven fabric to edgewise position in the fabric being woven, including means for maintaining the pile wire positively in accurate and proper edgewise position at all times.

45. In a pile loom, means for moving a flat pile wire to cut the woven pile loops, means for then transferring the wire to edgewise position for insertion into the fabric being woven, means for then inserting said wire edgewise, and operating mechanism for keeping the aforesaid three mechanisms operating in continuous succession.

46. In a pile loom, a reed, shedding mechanism for the ground warp threads, shedding mechanism for the pile threads, means for deflecting the selected pile warp threads into groups as they are moved to shed position, said deflecting means being arranged to separate the groups so as to form gaps between them in the shed, and pile wire inserting mechanism, including the means occupying said gaps and normally projecting into the pile warp shed.

47. In a pile loom, a reed, and obliquely extending deflectors adjacent one end of the reed dents for deflecting laterally the warp threads upon the formation of a shed, certain of said deflectors being set in staggered relation to the others for relieving the openings between the deflectors and affording free deflecting spaces for the movement of the threads.

48. In a pile loom, a reed, and obliquely extending deflectors adjacent one end of the reed dents for deflecting laterally the warp threads upon the formation of a shed, certain of said deflectors being set in staggered relation to the others for relieving the openings between the deflectors and affording free deflecting spaces for the movement of the threads combining with mechanism operating in the gaps formed by the deflectors for traversing a shuttle like member across the loom.

49. In a pile loom, a reed, and deflecting means adjacent one end of the reed dents having warp thread spaces formed as extensions of the spaces between the dents extending obliquely from the latter and having substantially uniform width for the free movement of the warp threads lengthwise of said spaces.

In testimony whereof, I have signed my name to this specification, in the presence of two subscribing witnesses.

THOMAS P. WALSH.

Witnesses:
EDWARD MAXWELL,
PHINEAS KEITH.